US008762722B2

(12) United States Patent
Roeder et al.

(10) Patent No.: US 8,762,722 B2
(45) Date of Patent: *Jun. 24, 2014

(54) SECURE INFORMATION DISTRIBUTION BETWEEN NODES (NETWORK DEVICES)

(75) Inventors: Michael Roeder, La Jolla, CA (US); Ponnappa Palecanda, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/482,295

(22) Filed: May 29, 2012

(65) Prior Publication Data

US 2012/0240209 A1 Sep. 20, 2012

Related U.S. Application Data

(62) Division of application No. 10/812,607, filed on Mar. 30, 2004, now Pat. No. 8,209,537.

(51) Int. Cl.
*H04L 29/06* (2006.01)

(52) U.S. Cl.
USPC ............................... 713/169; 380/278; 726/7

(58) Field of Classification Search
USPC ............................................................ 726/7
See application file for complete search history.

(56) References Cited

U.S. PATENT DOCUMENTS

| 4,530,092 | A | 7/1985 | Hafer | |
|---|---|---|---|---|
| 5,351,295 | A * | 9/1994 | Perlman et al. | 713/162 |
| 6,240,188 | B1 | 5/2001 | Dondeti et al. | |
| 6,263,435 | B1 | 7/2001 | Dondeti et al. | |
| 6,854,056 | B1 | 2/2005 | Benantar et al. | |
| 7,058,798 | B1 * | 6/2006 | Elley et al. | 713/156 |
| 7,240,203 | B2 * | 7/2007 | Kessler et al. | 713/171 |
| 7,644,275 | B2 | 1/2010 | Mowers et al. | |
| 2002/0152299 | A1 | 10/2002 | Traversat et al. | |
| 2003/0061481 | A1 | 3/2003 | Levine et al. | |
| 2003/0142039 | A1 | 7/2003 | Minear et al. | |
| 2003/0226017 | A1 | 12/2003 | Palekar et al. | |
| 2004/0005061 | A1 * | 1/2004 | Buer et al. | 380/282 |
| 2004/0210756 | A1 | 10/2004 | Mowers et al. | |
| 2004/0236965 | A1 | 11/2004 | Krohn | |
| 2004/0249846 | A1 | 12/2004 | Randall et al. | |
| 2005/0021946 | A1 | 1/2005 | Narayanan | |
| 2005/0086481 | A1 | 4/2005 | Winget | |

* cited by examiner

*Primary Examiner* — Hadi Armouche
*Assistant Examiner* — Bryan Wright (57) ABSTRACT

In an embodiment, a method of secure information distribution between nodes, includes: performing a handshake process with an adjacent node to determine membership in a secure group; and distributing secure information to the adjacent node, if the adjacent node is a member of the secure group. In another embodiment, an apparatus for secure information distribution between nodes, includes: a node configured to performing a handshake process with an adjacent node to determine membership in a secure group, and distribute secure information to the adjacent node, if the adjacent node is a member of the secure group.

18 Claims, 4 Drawing Sheets

SECURE INFORMATION DISTRIBUTION BETWEEN NODES (NETWORK DEVICES)

CLAIM FOR PRIORITY

The present application is a Divisional Application of commonly assigned and U.S. patent application Ser. No. 10/812,607, filed on Mar. 30, 2004 now U.S. Pat. No. 8,209,537, which is incorporated by reference herein in its entirety.

TECHNICAL FIELD

Embodiments of the present invention relate generally to communication networks, and more particularly to the distribution of secure information between network devices.

BACKGROUND

Current methods in the administration of network passwords and distribution of key information are time consuming and complicated. For example, network managers are required to manually program the passwords, key information, and/or other secure information into each network device in a network, when the password, key information, and/or other secure information are updated.

As another example of a current method, an authentication server in the network is used and is queried by the network device for the passwords or key information. However, the authentication server may be disadvantageously subjected to network failures such as link failures and server device failures. As such, a network failure will not permit other network device to obtain the updated passwords or key information or other important secure information.

Therefore, the current technology is limited in its capabilities and suffers from at least the above constraints or deficiencies.

SUMMARY OF EMBODIMENTS OF THE INVENTION

In one embodiment of the invention, a method of secure information distribution between nodes, includes: performing a handshake process with an adjacent node to determine membership in a secure group; and distributing secure information to the adjacent node, if the adjacent node is a member of the secure group.

In another embodiment of the invention, an apparatus for secure information distribution between nodes, includes: a node configured to performing a handshake process with an adjacent node to determine membership in a secure group, and distribute secure information to the adjacent node, if the adjacent node is a member of the secure group.

These and other features of embodiments of the invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1:
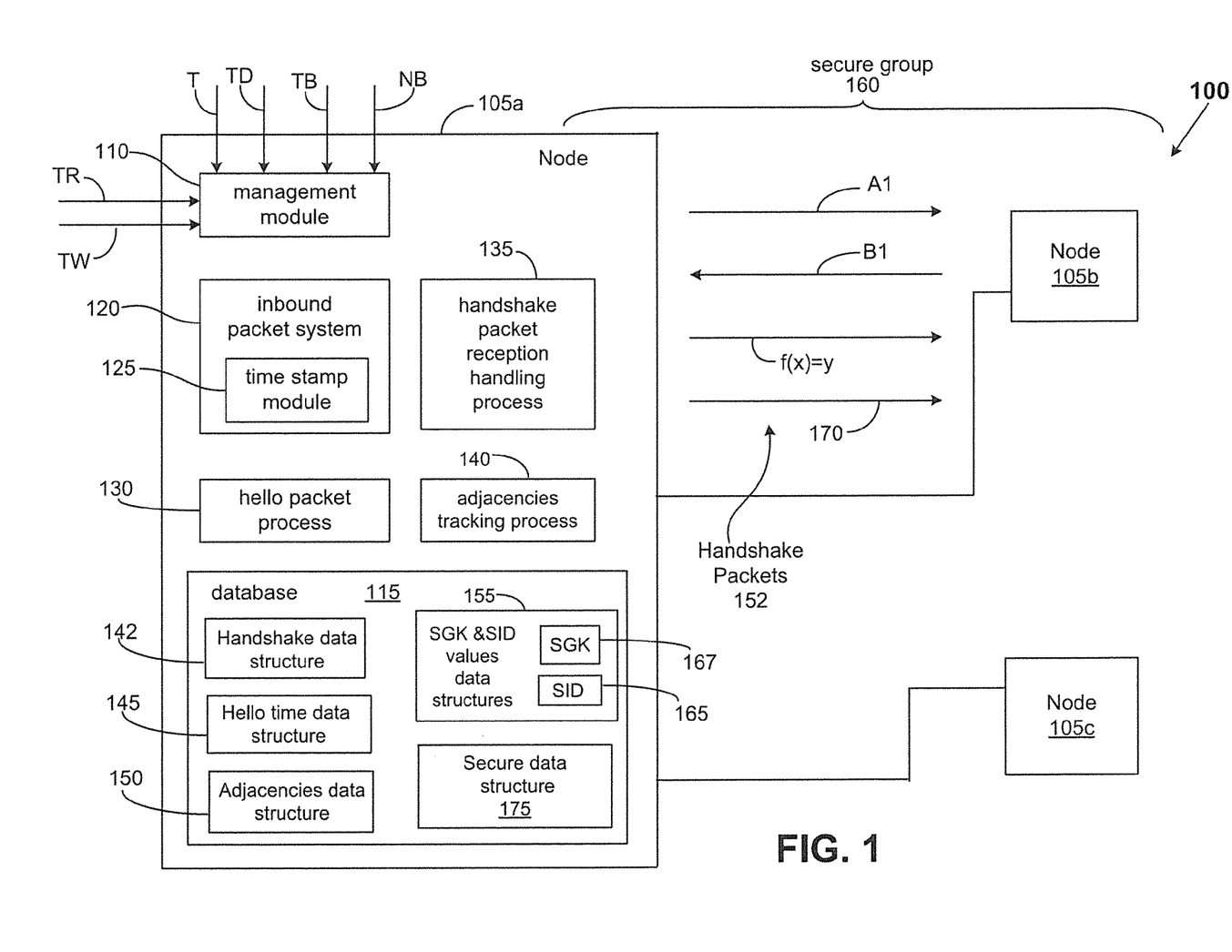
FIG. 1 is a block diagram of a system (apparatus) that can implement an embodiment of the invention.

FIG. 1 is a block diagram of a system (apparatus) 100 that can implement an embodiment of the invention. The system 100 is implemented in a communication network, and is used to distribute sensitive or secure information between sets of nodes (network devices). The nodes are generally referred to herein as nodes 105. In the example of FIG. 1, nodes 105$a$, 105$b$, and 105$c$ are shown for purposes of describing the operation of embodiments of the invention.

In an embodiment the node 105$a$ includes the following features or elements. It is noted that the other nodes 105$b$ and 105$c$ includes similar features or elements. A management module 110 can query, read, and write data to data structures in a database 115. An inbound packet system 120 receives and processes incoming packets. The inbound packet system 120 typically includes a time stamp module 125 that places a timestamp on stored data in the database 115.

A hello packet process 130 is configured to receive, process, and acknowledge the incoming HELLO packets. The hello packet process 130 receives the HELLO packets and detects nodes 105 that are not currently in an adjacency set of the node 105$a$. The node 105$a$ will then attempt to handshake with those detected nodes. As known to those skilled in the art, in the Open Shortest Path First (OSPF) communications protocol (which enables network routers to share information with each other), a HELLO packet is a special packet (message) that is sent out periodically from a router to establish and confirm network adjacency relationships. On networks capable of broadcast or multicast transmission, a HELLO packet can be sent from a router simultaneously to other routers to discover neighboring routers.

A handshake packet reception handling process 135 is configured to perform handshaking functions and handle packets in the handshaking process. This handshaking process is described below in additional detail.

An adjacencies tracking process 140 tracks the nodes 105 that are adjacent to the node 105$a$ and programs the nodes in the adjacency set, based upon the handshakes that are performed by the node 105$a$.

The database 115 includes the following data structures: handshake data structure 142, hello time data structure 145, adjacencies data structure 150, and SGK/SID data structure 155.

The handshake data structure 142 stores information that determines the nodes 105 that are suitable for handshaking with the node 105$a$. The handshake packet reception handling process 135 is configured to read data from the handshake data structure 142. The data that are stored in the handshake data structure 142 may include, for example, the values x and y for a one way function f(x)=y where y may be a secure hash value if f(x) is a secure hash function, x1 and x2 values which may be component values of x, and/or other suitable values.

The hello time data structure 145 stores the hello time value (which is the amount of time that needs to expire before the node 105a can initiate another handshaking process). The hello packet process 130 is configured to read data from the hello time data structure 145.

The adjacencies data structure 150 stores adjacencies information (i.e., nodes 105 that are adjacent to the node 105a). The adjacencies tracking process 140 is configured to read data from the adjacencies data structure 150.

The SGK/SID values data structure 155 stores all secure group key (SGK) values that are associated with each node 105 that are adjacent to the node 105a. The SGK/SID values data structure 155 also contains secure group identifier (SID) values and values that track all nodes 105 that are adjacent to the node 105a. The SGK and SID values are typically bit values.

The system 100 simplifies the distribution of secure information between nodes 105. Each node 105 in the system 100 is programmed with an SID value 165 and SGK value 167, by use of a secure channel (e.g., a console port). The management module 110 can input the programmed SID value 165 and SGK value 167 into the secure data structure 175. Once a node 105 is programmed with an SID value and SGK value, the node 105 will no longer require to be programmed with passwords or keys. The node 105 will automatically acquire the passwords or keys from other nodes 105 that are members of a secure group that contains the node 105.

Each node (network device) 105 is identified by a unique number, i, which could be the Media Access Control (MAC) of the node. As known to those skilled in the art, on a local area network (LAN) or other network, the MAC address is a unique hardware number of a node. When the node is connected to the Internet, a correspondence table relates the Internet Protocol (IP) address of the node to the node's physical (MAC) address on the LAN.

The nodes may form a secure group. In the example of FIG. 1, the secure group 160 is formed by the nodes 105a, 105b, and 105c. Each secure group 150 is identified by the SID 165 and a SGK 167. The secure group 160 is also referred to as the "SID group" 160. Nodes that share the same SID & SGK (i.e., nodes that are in the same secure group) can distribute sensitive or secure information to all other nodes that have the same SID and SGK pair values, as described further below.

The security of the system 100 depends on the secrecy of the SGK value. The SGK value, by itself, is not distributed by the nodes in the secure group. Authentication values are generated by sending the SGK value combined with other values by use of a one way function. Typically, this one-way function may be, for example, a one way secure hash. Any suitable hash function may be used in accordance with an embodiment of the inventions. One example of a one-way function is HMAC-MD5 (name taken from RFC 3118). As known to those skilled in the art, HMAC (keyed-hash message authentication code) is a type of message authentication code (MAC) calculated using a cryptographic hash function in combination with a secret key. As with any MAC, it may be used to simultaneously verify both the data integrity and the authenticity of a message. Any iterative cryptographic hash function, e.g., SHA-1, RIPEMD-160, may be used in the calculation of an HMAC; the cryptographic strength of the HMAC depends upon the cryptographic strength of the underlying hash function and on the size and quality of the key.

For a one way function that is expressed as, f(x)=y, the value y can be easily calculated for a given value of x. However, it would be extremely difficult to calculate the value of x, given the value of y. In one embodiment of the invention, the authentication value y is generated by applying the one way function to the SGK value concatenated with one value selected by each of the nodes that wishes to prove that the node is part of the secure group. Concatenation involves arranging strings of characters into a chained list.

In order for two nodes 105 to authenticate each other (determine that both are in the same secure group 160), each node will pass to the other node the two values Ai and Bi, where i is the node number of the node. Once all nodes that wish to establish themselves as members of the secure group (i.e., all authenticating nodes) have received the Ai, Bi values from all of the other authenticating nodes, each of the authenticating node D1 will perform an authentication operation by use of the one way function. For example, the operation may involve the one way secure hash function, V=SecureHash(SGK+SUM(Ai for all i where all i does not equal D1)+$B_{D1}$), where the operation "+" may be an additive operation, a concatenation, an exclusive OR (XOR) or other suitable addition-type operation. In this way, each authenticating node D1 will generate a value Vi that all of the other authenticating nodes can use to verify that a particular node i knows the SGK value. The node 105 that wishes to prove its membership in the secure group 160 will then send its value V in a multicast.

Once two nodes 105 have verified that they are both members of the same secure group 160, then it is safe for them to distribute password information, key information, and/or other secure information between each other, and pairs of nodes will then send each other, for example, a public encryption key for a public key encryption system. Public key encryption is a cryptographic system that uses two keys, which are a public key known to everyone and a private or secret key known only to the recipient of the message. An important element to the public key system is that the public and private keys are related in such a way that only the public key can be used to encrypt messages and only the corresponding private key can be used to decrypt them. Examples of suitable public key encryption system include, for example, the RSA (Rivest-Shamir-Adelman) algorithm, and PGP (pretty good privacy) algorithm.

Each node can alternatively encrypt a key for a symmetric encryption system, by using the public key for the node that they have authenticated. A symmetric encryption is a type of encryption where the same key is used to encrypt and decrypt the message. This differs from asymmetric (or public-key) encryption, which uses one key to encrypt a message and another to decrypt the message. Examples of suitable symmetric key encryption system include, for example, the DES single key system and the Rijendael single key system. Once the two nodes have shared the symmetric keys, the two nodes can securely distribute sensitive information between each other for their secure group.

Example of the Handshaking Process and Encryption Key Establishment

In FIG. 1, assume that node 105a wishes to prove to node 105b that both node 105a and node 105b are in the same SID group 160 (i.e., secure group 160). Therefore, if node 105a and node 105b are in the same SID group 160, then both nodes will have the same SID value 165. Assume that a one way function, f(x)=y, will be used in the handshaking process. The handshake process 135 (FIG. 1) in the node 105a will inform the handshake process (not shown in FIG. 1) in the node 105b about a value A1 that the handshake process 135 will place in the in the one way function f(x). The value A1 is one of the components for x in the one way function f(x).

In response to the A1 value, the handshake process in node 105b will issue a challenge to the handshake process 135 in the node 105a. This challenge will be a value B1, which is another component of x in the one way function f(x).

The handshake process 135 in node 105a will then appropriately combine the A1 and B1 values of x and calculate f(x)=y. The y value is referred to herein as a secure hash value y. It is noted, however, that the value y is not necessarily a secure hash value y because the one way function f(x)=y is not necessarily limited to a secure hash function. When calculating the secure hash value y, the x value also includes the SGK value 167. The handshake process 135 then sends the calculated secure hash value y to the handshake process in node 105b.

The A1 value, B1 value, and one way function y value are typically transmitted from one node 105 to another node 105 by use of the handshake data packets 152.

Note that the SID 165 and SGK 167 are also stored in an SGK/SID values data structure in a database in node 105b. If node 105a and node 105b are in the same SID group 160, then node 105a and node 105b will have the same values for SID 165 and will have the same values for SGK 167.

Node 105b will apply the one way function f(x) for an x value that includes the A1 value, B1 value, and SGK 167 to calculate the secure hash value y. Since node 105b and node 105a each has calculated the same secure hash value y, node 105b is now aware that node 105b and node 105a have the same SGK value 167. Therefore, node 105b is now aware that node 105b and node 105a are in the same SID group 160.

The node 105b supplies an x component value (B1) as a challenge to node 105a, for use in the calculation of the one way function f(x), so that node 105b can validate that node 105a is a member of the SID group 160. If node 105b does not supply the B1 value as a challenge to node 105a, then node 105a may just use (for the f(x) function calculation) a particular value that it overhears in the network, in order to inform node 105b that it belongs to the same SID group 160. Therefore, the B1 challenge value helps to prevent the vulnerability of the system 100 to a hacker.

The node 105a also supplies an x component value (A1) to the f(x) function calculation, so that the one way function is not hacked by a suitable known plain text attack. Therefore, the A1 value provided by node 105a helps to prevent the vulnerability of the system 100 to a hacker.

After the above handshaking process has completed, nodes 105a and 105b can establish an encryption key 170 to permit a secure channel of communication between the two nodes 105a and 105b. Therefore, the encryption key 170 is used for secure future communication between the two nodes 105a and 105b. As mentioned above, the encryption key 170 may be a symmetric encryption key in order to achieve faster processing speed. The encryption key 170 may also be based on the public-private encryption key algorithm, although this may lead to more complexity and slower processing speed.

In an embodiment, the encryption key 170 is embedded in the handshake packet that contains the one way function value y. This prevent an unauthorized third party from intercepting the handshake packet with the y value and prevents the unauthorized re-writing of the encryption key 170 prior to receipt of the destination node. By embedding the encryption key 170 in the handshake packet with the y value, an unauthorized third party is prevented from re-writing the encryption key 170 unless the third party knows the SGK value 167.

In another embodiment, the encryption key 170 may be sent to the destination node as a data packet that is separate from the handshake packet with the y value.

The above handshaking process and encryption key establishment is used between other node pairs in the SID group 160. For example, node 105a and node 105c can perform the handshaking process and establish an encryption key for secure communication. As another example, node 105b and node 105c can perform the handshaking process and establish an encryption key for secure communication. Other nodes 105 may be included in the SID group 160. Alternatively, the SID group 160 may include only two nodes 105.

Each node in an SID group 160 form the adjacencies set. The secure group 160 will have stabilized after all adjacencies between nodes 105 in the SID group 160 have been formed by use of the handshaking process.

When a password (or other secure information) in the secure data structure 175 is updated in a node 105 (e.g., node 105a), then the management module 110 will distribute the updated password to the other nodes 105b and 105c in the SID group 160. Therefore, embodiments of the invention advantageously avoid the previous requirement of manually programming each updated password in each node.

The system 100 could also be used to distribute keys that permit secure communication across the network. The key should ideally be changed periodically to maintain a secure communication across the network. When a key in the secure data structure 175 is updated, then the management module 110 will distribute the updated key to the other nodes 105b and 105c in the SID group 160.

Secure Group Construction

In order to maintain the security of the system 100, the SGK value 167 must be unknown to other nodes that are not members of the SID group 160. As the distribution increases across the network for the y value (generated by the one way function f(x)), the likelihood also increases for an attacker to be able to reverse engineer the SGK value 167. Therefore, it is advantageous to change the SGK value 167 based upon the frequency in which the y value is advertised across the network.

Figure 2:
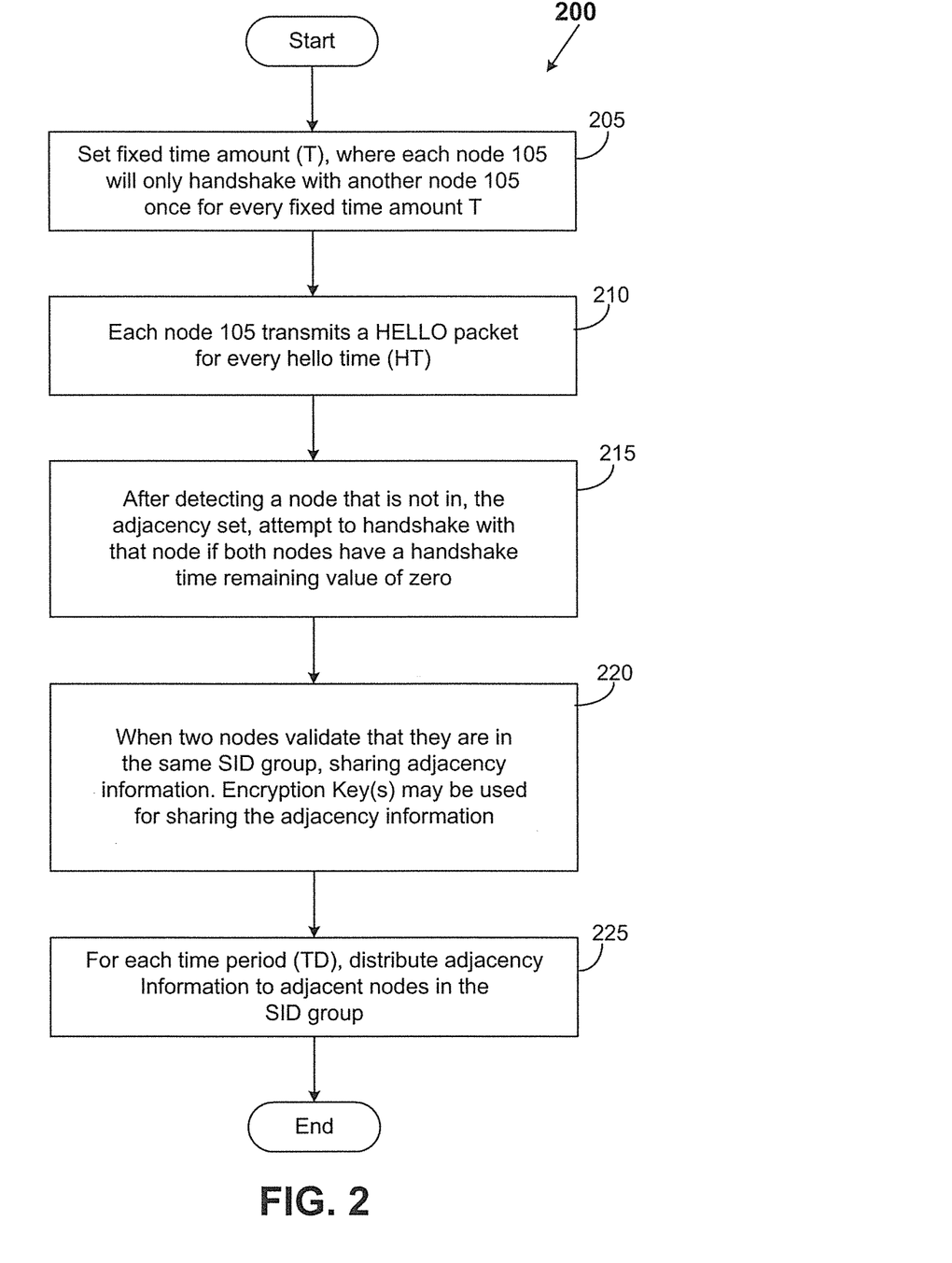
FIG. 2 is a flowchart of a method, in accordance with an embodiment of the invention.

FIG. 2 is a flowchart of a method 200, in accordance with an embodiment of the invention. In order to prevent attackers from discerning the SGK value 167 by taking numerous samples of hash values y, the number of transmissions of the y value will be limited. Each node 105 will only handshake with another node 105 once for every fixed amount of time T. (step 205). This time amount T may be programmed into the management module 110. The time amount T or possible ranges for T is user configurable. The time amount T value could start and stop on given dates or could be infinite allowing the user to keep the same keys. The above limitation on the number of handshakes permits a well understood frequency in which the SGK value 167 is changed. For example, assume that only one handshake is performed every time T per node 105 in the network. Since the number of nodes in the SID 160 is known and the time T is pre-determined, then a maximum length of time can be determined before the SGK value 167 will require to be changed. Therefore, the time T serves the purpose of protecting the SGK value 167 by providing a well understood frequency by which the SGK value 167 must be changed to maintain security in the system 100.

Each node 105 in the secure group 160 will transmit a HELLO packet for every time (hello time) HT (step 210). The hello time HT could typically be set at a value of approximately one minute. However, hello time HT may also be set to a user configurable value. This HELLO packet will contain the SID value 165, along with the amount of time remaining before that node 105 will be allowed to handshake again. When a particular node 105 detects the presence of a member (node) that is not in the adjacency set (which is stored in adjacencies data structure 150) of that particular node 105, then that particular node 105 will attempt to handshake with that member if both the particular node 105 and its new neighbor (the member) have a handshake time remaining value of zero (0) (step 215). By waiting for both nodes to have a remaining value of zero, a reverse attack is prevented, since the above time requirement insures that there is a well understood amount of time that will occur between handshakes and a well understood maximum number of handshakes that will occur per time T.

When two nodes 105 discover each other and validate that they are in the same SID group 160, the nodes 105 will share (distribute) their adjacency information for using the VLAN (virtual local area network) (step 220). The adjacency information may be distributed by using the encryption keys 170 that the nodes 105 traded during the handshake process. The adjacency information includes the node IDs and the symmetric key for each node 105. The convergence time for the SID group 160 (i.e., the time when the SID group 160 has stabilized) will be Log N, where N is the number of nodes in the SID group 160.

When a particular node 105 obtains the secure adjacency set (information) from another node 105 as a result of the handshaking process, then the particular node 105 will redistribute to all of its existing adjacency information to the nodes 105 that it did not previously have in its adjacency set using its own encryption key 170. As noted below, the encryption key 170 may be a symmetric key or a public-private key.

The adjacency information will be stored in the adjacencies data structure 150 (FIG. 1). The distribution of the adjacency information is distributed on a per VLAN basis. Therefore, the distribution of the adjacency information is performed within the Layer 2 broadcast domain. Each particular node 105 will distribute the adjacency information to adjacent node(s) 105 within the broadcast domain of the particular node 105. In the example of FIG. 1, node 105*a* distributes the adjacency information to adjacent nodes 105*b* and 105*c*. Node 105*b* distributes adjacency information to other nodes that may be adjacent to node 105*b*. In this way, new nodes 105 will discover each other and establish themselves as members of SID groups 160 and SID groups 160 can be combined. Periodically, for each time period TD, each node 105 will distribute a list of all of its adjacencies information with their symmetric, keys 170 to adjacent nodes in the SID group 160 so that all nodes 105 in the SID group 160 remains synchronized (step 225).

Database and Data Distribution

All transmission from a node 105 to the secure group 160 will typically be transmitted by using the encryption key 170 (e.g., symmetric key) for that node 105 and will be sent to a Secure Group Management multicast MAC.

Figure 3:
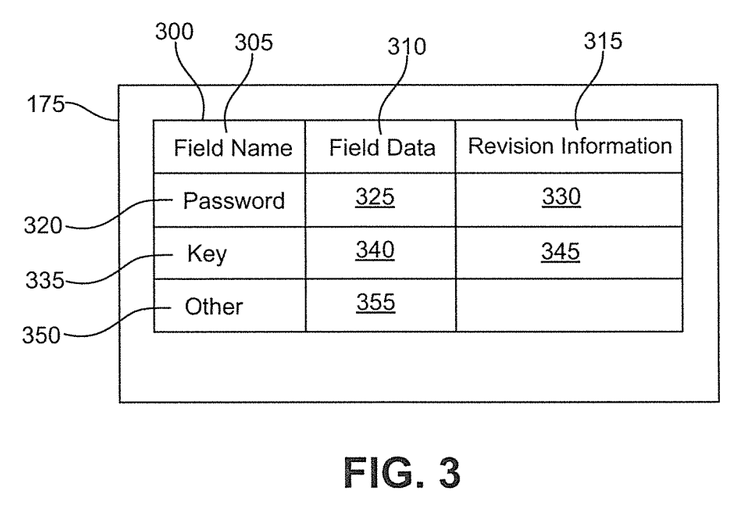
FIG. 3 is a block diagram of a table with secure information, in accordance with an embodiment of the invention.

The secure group 160 will be used for distributing sensitive information that is specific to that secure group 160. Each node 105 maintains a database of information that can be queried by authorized software entities that are running on the node 105. For example, the management module 110 can query the secure data structure 175 that stores the sensitive information. As shown in FIG. 3, in an embodiment, the secure data structure 175 includes a table 300 with a field name column 305, field data column 310, and revision information column 315. The field name column 305 identifies the type of database entry that can be queried by the management module 110. For example, the field names may include password 320 which indicates that the data in field 325 is the password information that is used by the secure group 160. The field 330 indicates revision information for the password information in field 325.

As another example, the field name column 300 may include key 335 which indicates that the data in field 340 is a key value that is used for secure communication between the nodes 105 in the secure group 160. The field 345 indicates the revision information for the key value in field 340.

As another example, the field name column 300 may include other secure information 350 which indicates that the data in field 355 is another type of secure information that is relevant for the secure group 160.

The revision information in fields 330 or 345 may indicate, for example, a sequence number of the associated secure data in field 325 or 340, respectively. The sequence number is incremented for each update occurrence in the secure data.

The revision information in fields 330 or 345 may alternatively indicate, for example, a modification date of the associated secure data in field 325 or 340, respectively. The modification date will indicate when the secure data was previously updated.

The revision information in fields 330 or 345 may alternatively indicate, for example, a delta time (DTV) indicating the elapsed time since the previous modification of the associated secure data in field 325 or 340, respectively. An advantage of using the delta time value for the revision information column 315, rather than using a date of last modification, is that using a date of last modification requires that systems have a secure mechanism for maintaining synchronized system clocks. The advantage of using the DTV value over a sequence number is that sequence numbers could have problems in determining the value that is actually the most recent version of the data, when the SID group 160 becomes disjoint (discontiguous). An SID group 160 can become disjoint, for example, when the SID group 160 is being constructed or after a network topology change.

The revision information in column 315 insures that each node 105 in the secure group 160 is able to receive and maintain the latest version of the secure information in the secure data structure 175. The revision information in column 315 determines an age of the associated secure information so that each node 105 in the secure group 160 will store a latest version of the secure information.

In addition, the node 105 will update all adjacent nodes 105 when the database (table 300) of the node 105 is modified. As a result, all of the database for a particular SID group 160 will be kept synchronized. When the table 300 is modified internally, the node 105 will redistribute the modified entries of table 300 to all of its adjacent nodes 105 that are members of the SID group 160. This redistribution may occur either immediately or after a specified wait interval so that the modifications are lumped together. When a particular node 105 receives an entry update from an adjacent node 105 that changes the state of its database table 300, the particular node 105 will redistribute that change to all of its adjacent neighbor nodes 105 (excluding the inbound VLAN) with a single set of multicast frames for each VLAN that the particular node 105 is running on. For every time period TD, the particular node 105 will distribute its database table 300 changes to its adjacent neighbor nodes 105.

As mentioned above, the secure database system 100 can be used to distribute any sensitive information. In one embodiment, the secure database system 100 can be used to distribute password information to nodes 105 that are switches, so that a user can update their password for all switches on the network by having the modified password propagate across the network. The secure database system 100 could also be used as part of a key management system for applications that require keys to be shared between nodes 105.

Resolving Ambiguity Between Entry Updates

In the event that a particular node 105 receives an update for an entry (in the table 300), where the updated entry has the same sequence value (this sequence value could be a version number or a date) as the entry that the particular node 105 already has in its database table 300, the particular node 105 will pick the entry that has the larger data value and discard the other entry, in an embodiment of the invention. As a result, the database tables 300 in the nodes 105 of the secure group 160 will remain synchronized even if they receive different data elements with the same sequence, version, and date information.

Figure 4:
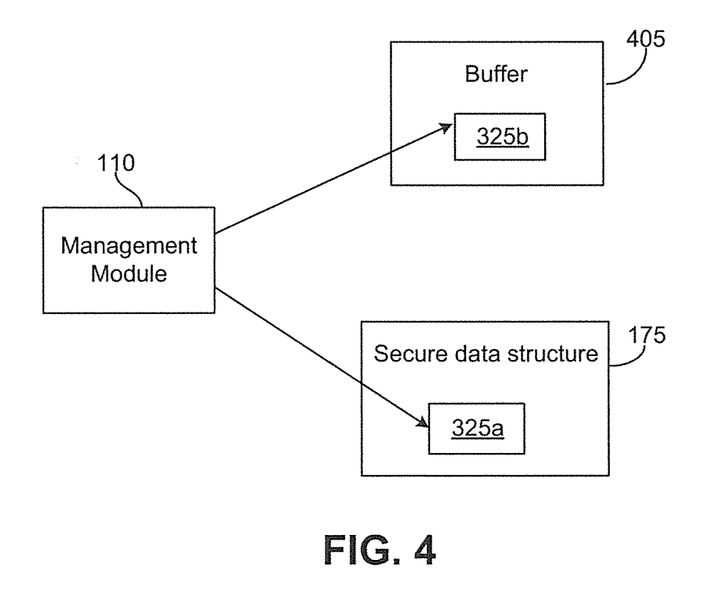
FIG. 4 is a block diagram shown for the purpose of illustrating a method to resolve ambiguity between entry updates.

FIG. 4 illustrates an example of a method to resolve ambiguity between entry updates. Assume that the management module 110 detects that the currently stored secure information 325a and the recently received updated secure information 325b. The recently received updated secure information 325b is typically buffered into, for example, an inbound packet buffer 405. Assume that both secure information 325a and 325b have the same revision information 315 (e.g., both of the secure information 325a and 325b have the same sequence number). If the management module 110 determines that secure information 325a is larger in data value than the secure information 325b, then the management module 110 will keep the secure information 325a as stored in the secure data structure 175 and will discard the recently received secure information 325b. On the other hand, if the management module 110 determines that secure information 325b is larger in data value than the secure information 325a, then the management module 110 will store the secure information 325b into the secure data structure 175 and will discard the secure information 325a.

The above condition of ambiguity between entry updates in the tables 300 typically occur, for example, if sequence numbers are being used for the revision information column 315 and the network becomes temporarily discontiguous, or if the values in the table 300 are being updated too quickly.

Protecting SGK Values and Symmetric Keys

Figure 5:
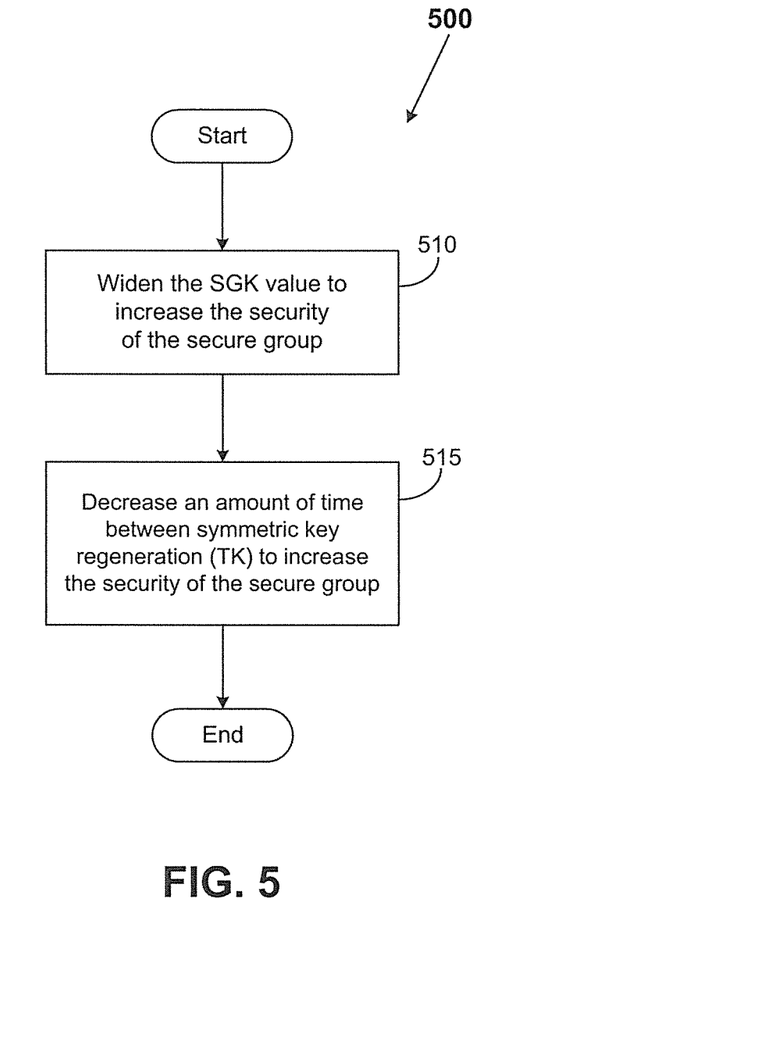
FIG. 5 is a block diagram illustrating a method for increasing the security of the secure group.

FIG. 5 is a block diagram illustrating a method 500 for increasing the security of the secure group. As the number of nodes 105 in a particular SID group 160 increases, the system 100 may become more vulnerable to an attack. With each additional node 105, the number of sample hash values y that an attacker can acquire per unit time increases. The number times that the y value is advertised will influence the amount of time that may pass before the SGK 167 for an SID 165 must be changed. In order to compensate for an increased number of nodes 105 in an SID group 160, the SGK value 167 is widened, the output of the one way function f(x) will be larger, the symmetric keys 170 will be larger, and/or the times T, TD, and HT will be increased. The security of the system 100 can be increased by widening the SGK value 167 (step 510). For example, the SGK value 167 can be widened from a few hundred bits to a few thousand bits.

In addition to sharing adjacency information (in data structure 150 in FIG. 1) and database information (in secure data structure 175), each node 105 will also have to generate new symmetric keys 170 periodically. The amount of time between symmetric key regeneration, TK, can be decreased (step 515) to increase the security of the system 100. By periodically generating symmetric keys 170 with new values, an attacker is unlikely to determine the values of the symmetric keys 170.

Password Distribution

In an embodiment of the invention, passwords will be administered by using a command that updates one of the database tables 300 in the nodes 105. The management module 110 (FIG. 1) may be used to update the table 300 with the password data in field 325. This update will cause the new password information to be distributed to all nodes 105 that are members of a particular secure group 160.

Rapid Convergence

In order to allow for rapid group construction (such as when a plurality of nodes 105 are booted), the nodes 105 may be configured to transmit a burst of NB handshakes for every amount of time TB. NB is the number of handshakes and TB is the time amount between burst of handshakes. Note that the time T, as mentioned above, is the time between handshakes. The values of TB and NB can be set via the management module 110.

Avoiding Excessive Joins

To prevent a single node 105 from attempting to handshake with numerous adjacent nodes after booting or after two SID groups 160 are joined through a network topology change, each node 105 will only try to establish membership with one adjacent node at a time, and will wait at time TW±TR between handshake attempts, where TW is a fixed configurable time amount and TR is a random amount of time that is bounded by a bound range that can be specified by the user. The TW and TR values are set to any suitable values so that the nodes do not attempt to communicate at the same time. A variance of approximately two seconds to approximately one minute for the TW and TR values would be acceptable.

For example, node 105a will only try to establish membership in the SID group 160 with node 105b, and another node (e.g., node 105c) will try to establish membership in the SID group 160 with another node (e.g., node 105b). Node 105a can then establish membership in the SID group 160 with another node (e.g., node 105c).

Therefore, embodiments of the invention simplify the distribution of secure information between nodes. For example, embodiments of the invention simplify the administration of network passwords, the distribution of key information, and/or the distribution of other types of secure information.

The various engines, tools, or modules discussed herein may be, for example, software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of secure information distribution with an adjacent network device, the method comprising:
providing, by a first network device, a component value A1 to the adjacent network device;
receiving, by the first network device, a component value B1 from the adjacent network device;
performing, by the first network device, a handshake process with the adjacent network device to determine membership of the adjacent network device in a secure group, wherein the handshake process comprises calculating a value by applying the component values A1 and B1, and a key value associated with the secure group, to a one-way function f(x), wherein the key value is obtained prior to the handshake process;
distributing secure information to the adjacent network device if a determination is made from the calculated value that the adjacent network device is a member of the secure group; and
allowing for construction of the secure group by transmitting a burst of NB handshakes for every amount of time TB, where NB is a number of handshakes and TB is a time amount between burst of handshakes.

2. The method of claim 1, wherein performing the handshake process comprises:
performing the handshake process with the adjacent network device once for every fixed amount of time.

3. The method of claim 1, further comprising:
detecting, by the first network device, a presence of another network device that is not in an adjacency set; and
performing a handshake process with the another network device if the first network device and the another network device both have a handshake time remaining value of zero.

4. The method of claim 1, further comprising:
determining an age of the secure information so that a latest version of the secure information is to be stored.

5. The method of claim 4, wherein determining the age of the secure information comprises:
checking a sequence number of the secure information, a date of modification of the secure information, or an elapsed time since a previous modification of the secure information.

6. The method of claim 1, further comprising:
resolving an ambiguity between a received updated secure information and currently stored secure information by selecting the secure information with a larger data value.

7. The method of claim 1, further comprising:
increasing a security of the secure group by widening the key value associated with the secure group.

8. The method of claim 1, further comprising:
after the handshake process and prior to distributing the secure information, establishing an encryption key with the adjacent network device,
wherein the encryption key is to be used to distribute the secure information to the adjacent network device.

9. The method of claim 1, further comprising:
preventing attempts to perform the handshake process with numerous network devices to avoid excessive joins, by establishing membership with one adjacent network device at a time, and waiting at time TW+TR between handshake attempts, where TW is a fixed time amount and TR is a random amount of time that is bounded by a user-specified bound range.

10. An apparatus for secure information distribution with an adjacent network device, the apparatus comprising:
a processor; and
a memory storing machine readable instructions that, when executed by the processor, cause the processor to:
provide a component value A1 to the adjacent network device;
receive a component value B1 from the adjacent network device;
perform a handshake process with the adjacent network device to determine membership of the adjacent network device in a secure group;
calculate, for the handshake process, a value by applying the component value A1, the component value B1, and a key value associated with the secure group, to a one-way function f(x), wherein the key value is stored in the apparatus prior to the handshake process;
distribute secure information to the adjacent network device if the adjacent network device is determined to be a member of the secure group; and
allow for construction of the secure group by transmitting a burst of NB handshakes for every amount of time TB, where NB is the number of handshakes and TB is a time amount between burst of handshakes.

11. The apparatus of claim 10, wherein the machine readable instructions are further to cause the processor to perform a handshake process with another network device if the processor and the another network device both have a handshake time remaining value of zero.

12. The apparatus of claim 10, wherein the machine readable instructions are further to cause the processor to resolve an ambiguity between a received updated secure information and currently stored secure information by selecting the secure information with a larger data value.

13. The apparatus of claim 10, wherein the machine readable instructions are further to cause the processor to increase a security of the secure group by widening the key value associated with the secure group.

14. The apparatus of claim 10, wherein, after the handshake process and prior to distributing the secure information, the machine readable instructions are further to cause the processor to establish an encryption key with the adjacent network device, wherein the encryption key is to be used to distribute the secure information from the processor to the adjacent network device.

15. The apparatus of claim 10, wherein the machine readable instructions are further to prevent the processor from attempting to perform a handshake process with numerous network devices to avoid excessive joins, by establishing membership with one adjacent network device at a time, and waiting at time TW+TR between handshake attempts, where TW is a fixed configurable time amount and TR is a random amount of time that is bounded by a user-specified bound range.

16. A non-transitory storage medium storing machine-readable instructions, which when executed by a processor cause a first network device to:

provide a component value A1 to the adjacent network device;
receive a component value B1 from the adjacent network device;
perform a handshake process with an adjacent network device to determine membership of the adjacent network device in a secure group;
calculate, for the handshake process, a value by applying the component value A1, the component value B1, and a key value associated with the secure group, to a one-way function f(x), wherein the key value is stored in the non-transitory storage medium prior to the handshake process;
distribute secure information to the adjacent network device if the adjacent network device is determined to be a member of the secure group; and
allow for construction of the secure group by transmitting a burst of NB handshakes for every amount of time TB, where NB is the number of handshakes and TB is a time amount between burst of handshakes.

17. The non-transitory storage medium of claim 16, wherein the machine-readable instructions further comprise machine-readable instructions to cause the first network device to:
resolve an ambiguity between a received updated secure information and currently stored secure information by selecting the secure information with a larger data value.

18. The non-transitory storage medium of claim 16, wherein the machine-readable instructions further comprise machine-readable instructions to cause the first network device to:
increase a security of the secure group by widening the key value associated with the secure group.

\* \* \* \* \*